(12) United States Patent
Eo et al.

(10) Patent No.: US 9,869,369 B2
(45) Date of Patent: Jan. 16, 2018

(54) TRANSMISSION FOR VEHICLE

(71) Applicant: Hyundai Motor Company, Seoul (KR)

(72) Inventors: Soon Ki Eo, Ansan-si (KR); Chon Ok Kim, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 285 days.

(21) Appl. No.: 14/819,070

(22) Filed: Aug. 5, 2015

(65) Prior Publication Data
US 2016/0230845 A1 Aug. 11, 2016

(30) Foreign Application Priority Data

Feb. 5, 2015 (KR) .......................... 10-2015-0017947

(51) Int. Cl.
| F16H 3/00 | (2006.01) |
| F16H 3/10 | (2006.01) |
| F16H 3/08 | (2006.01) |
| F16H 3/093 | (2006.01) |

(52) U.S. Cl.
CPC .............. *F16H 3/006* (2013.01); *F16H 3/10* (2013.01); *F16H 2003/007* (2013.01); *F16H 2003/0803* (2013.01); *F16H 2003/0938* (2013.01)

(58) Field of Classification Search
CPC ......... F16H 2003/007; F16H 2003/008; F16H 2003/0803; F16H 2003/0815; F16H 2003/0935; F16H 2003/0938; F16H 37/021; F16H 61/688; F16H 3/006; F16H 3/095; F16H 3/10

USPC .................................. 74/330, 331, 333, 340
See application file for complete search history.

(56) References Cited

U.S. PATENT DOCUMENTS

| 8,595,925 | B2 | 12/2013 | Chen et al. | |
| 9,453,558 | B2 * | 9/2016 | Wittkopp | F16H 3/006 |
| 9,670,991 | B2 * | 6/2017 | Eo | F16H 3/006 |
| 2012/0000743 | A1 * | 1/2012 | Wittkopp | F16H 3/006 192/219.1 |
| 2013/0263682 | A1 * | 10/2013 | Eo | F16H 3/006 74/331 |
| 2015/0285340 | A1 * | 10/2015 | Kim | F16H 3/006 74/330 |

FOREIGN PATENT DOCUMENTS

| DE | 102010007639 A1 * | 8/2011 | ............. F16H 3/006 |
| JP | 2003 247611 A | 9/2003 | |

(Continued)

*Primary Examiner* — Victor L MacArthur
*Assistant Examiner* — Joseph H Brown
(74) *Attorney, Agent, or Firm* — Brinks Gilson & Lione

(57) ABSTRACT

A transmission includes: a first input shaft selectively receiving power from an engine; a second input shaft receiving power from the engine; an output shaft disposed in parallel with the first input shaft; first and second countershafts, and first and second shift units; and a one-way clutch disposed in a power transmission line from the engine to the output shaft and through the second shift unit, transmitting power from the engine only to the output shaft. In particular, the first and second countershafts transmit power to the output shaft, the first shift unit carries out a series of desired gear shifts, and the second shift unit performs duplicate gear shifts one of which gear ratio is the same as one of gear ratios of the series of gear shifts made by the first shift unit.

9 Claims, 9 Drawing Sheets

(56) References Cited

FOREIGN PATENT DOCUMENTS

| JP | 2005-076875 A | 3/2005 |
|----|---------------|--------|
| JP | 2005-195115 | 7/2005 |
| JP | 2013-119280 A | 6/2013 |
| JP | 2013-119882 | 6/2013 |
| JP | 2013-133841 | 7/2013 |
| KR | 10-2012-0043347 A | 5/2012 |
| KR | 10-1198701 B1 | 11/2012 |

* cited by examiner

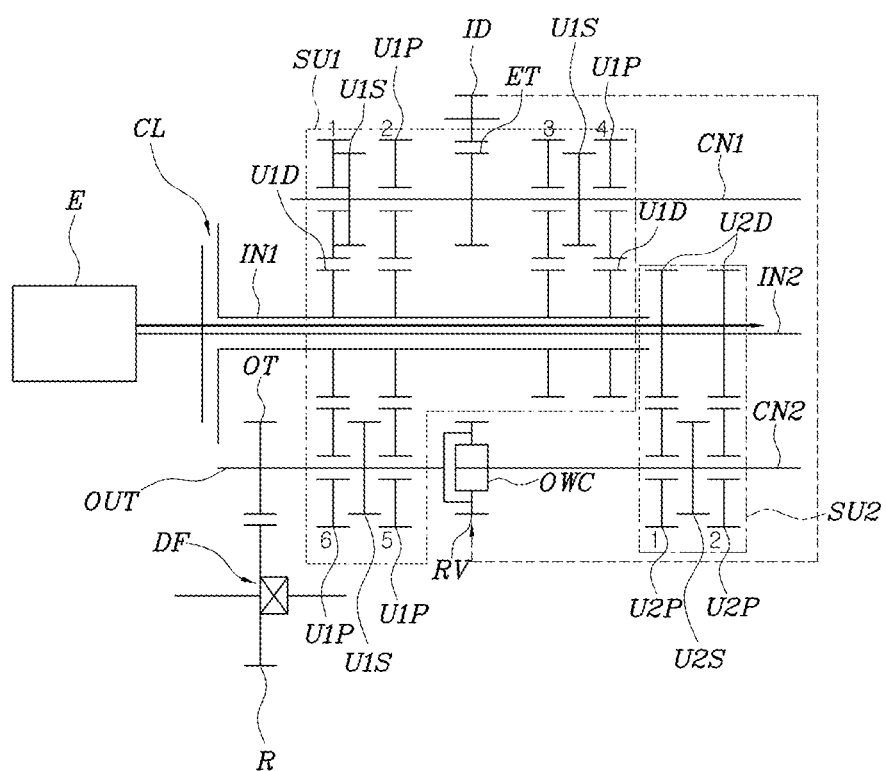
[Fig. 2]

[Fig. 3]
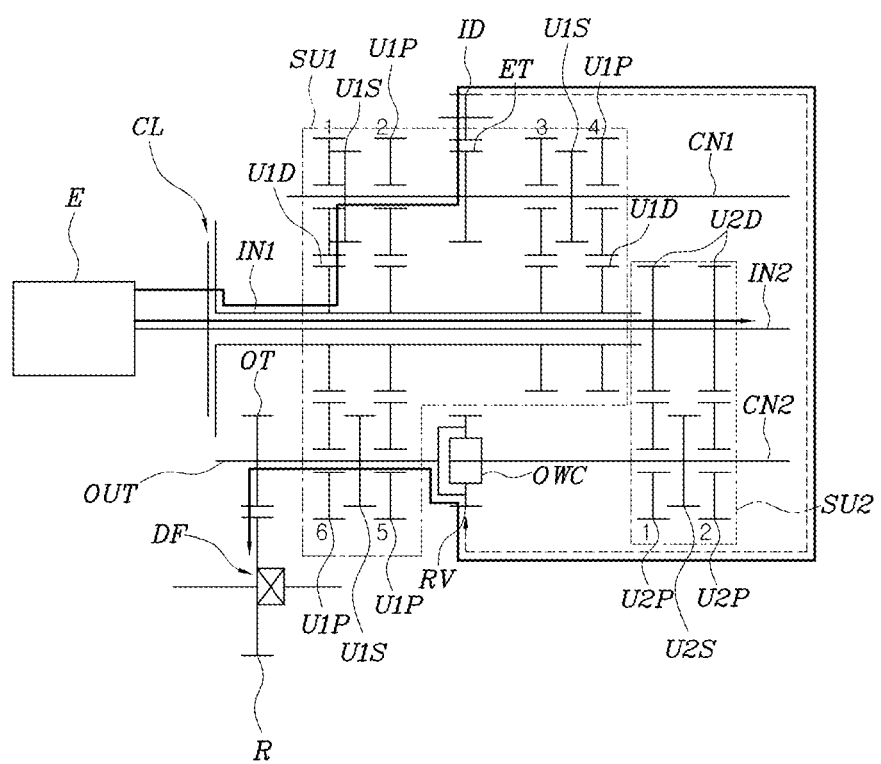

[Fig. 4]
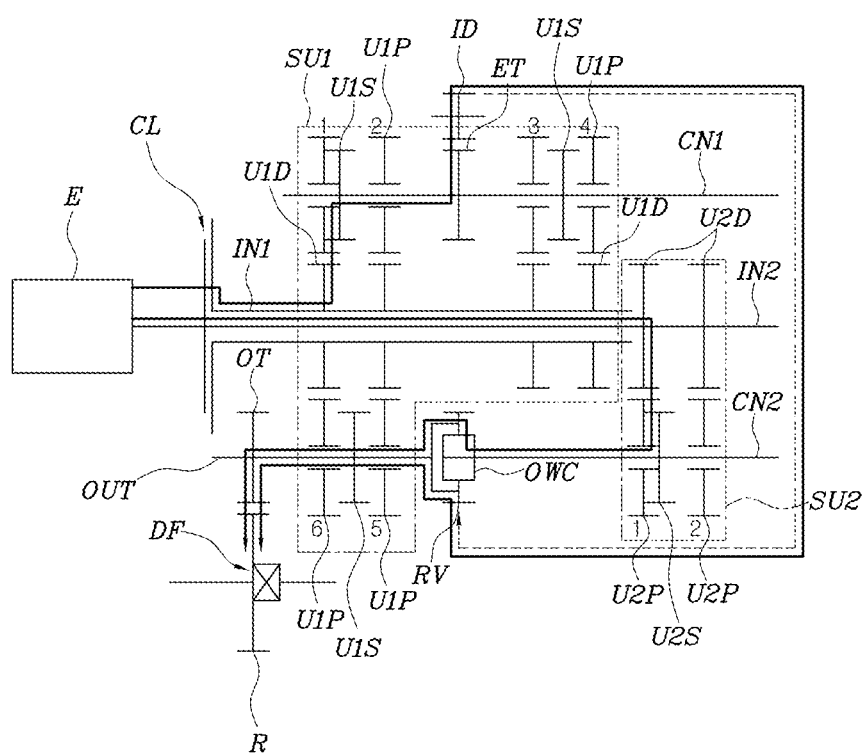

[Fig. 5]
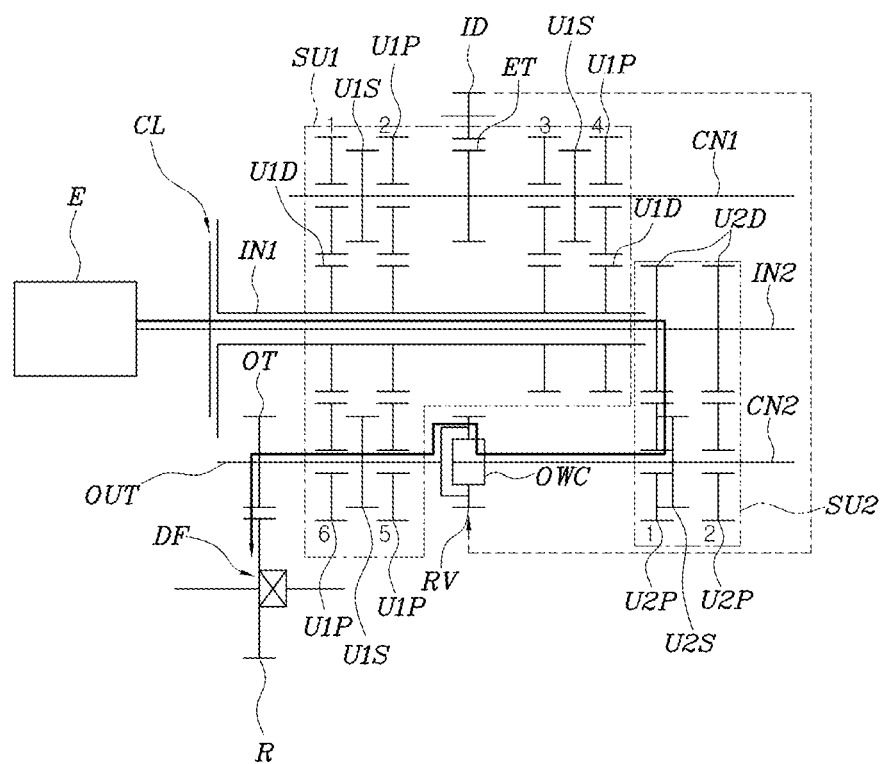

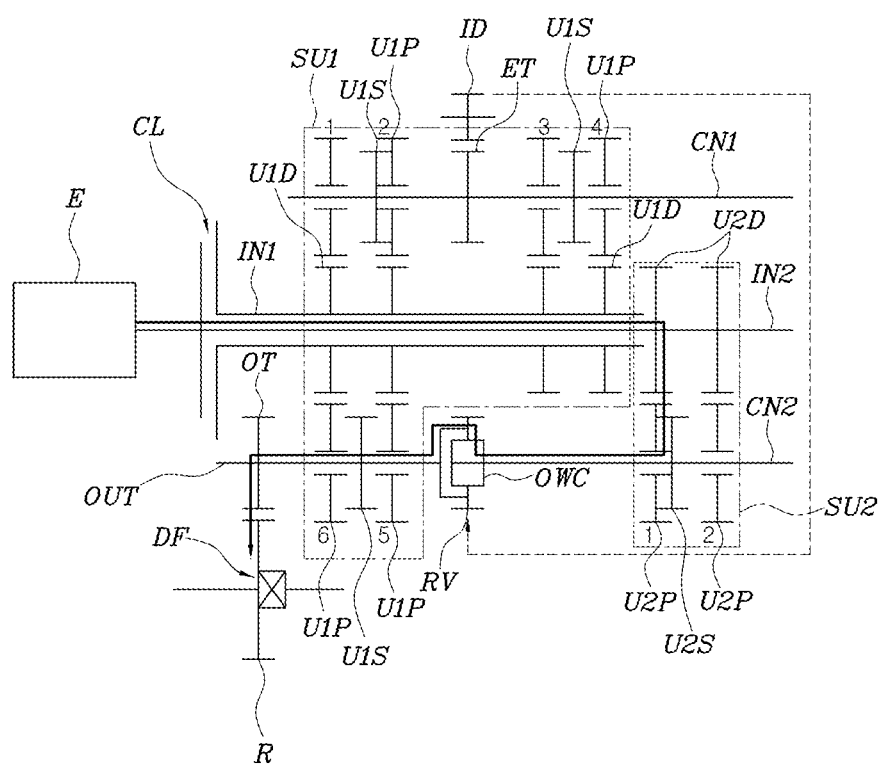
[Fig. 6]

[Fig. 7]
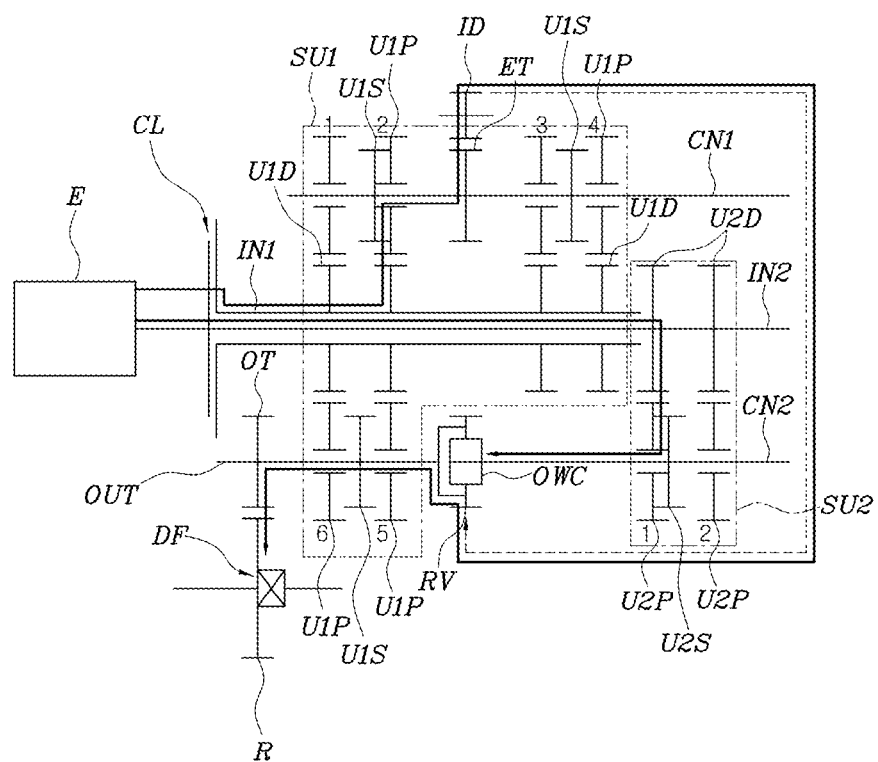

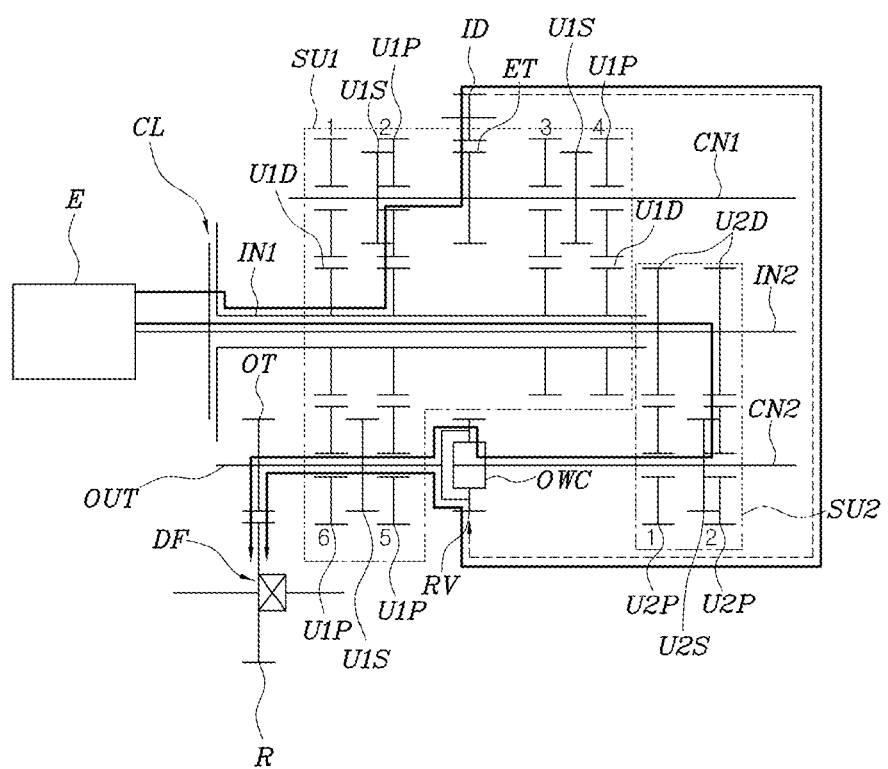
[Fig. 8]

[Fig. 9]
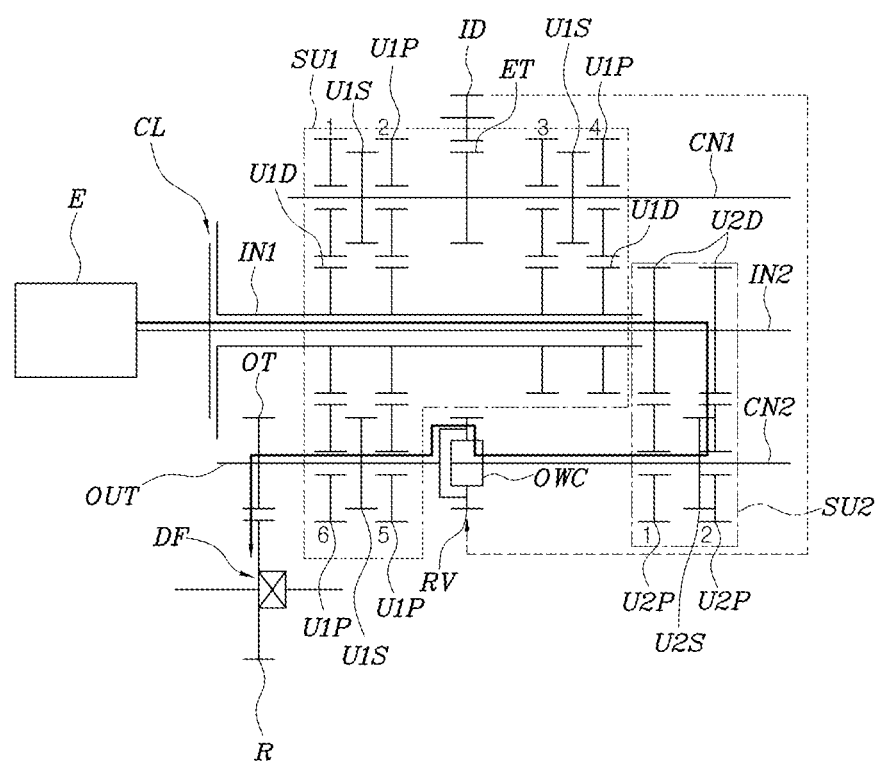

TRANSMISSION FOR VEHICLE

CROSS REFERENCE TO RELATED APPLICATION

The present application claims the benefit of Korean Patent Application Number 10-2015-0017947, filed on Feb. 5, 2015, which is hereby incorporated by reference in its entirety.

FIELD

The present disclosure relates to a transmission for a vehicle, and more particularly, to the configuration of a transmission that can automatically shift.

BACKGROUND

The statements in this section merely provide background information related to the present disclosure and may not constitute prior art.

In the related art, an AMT (Automated Manual Transmission) includes a clutch actuator for connecting/disconnecting a clutch and a shift actuator for engaging shift gears and disengaging desired shift gears and can automatically shift by operating the clutch actuator and the shift actuator in accordance with the driving states of a vehicle.

However, it has been discovered that, according to the AMT, it is required to cut torque from the clutch actuator to the AMT in order to disengage a previous shift gear and engage a new desired shift gear by operating the shift actuator. Such torque cut causes torque interruption due to cutting torque that is supposed to be supplied to driving wheels from an engine so that smooth shifting and comfort riding deteriorates.

The foregoing is intended merely to aid in the understanding of the background of the present disclosure, and is not intended to mean that the present disclosure falls within the purview of the related art that is already known to those skilled in the art.

SUMMARY

The present disclosure provides a transmission for a vehicle that can inhibit or prevent deterioration of smooth shifting and comfort riding due to torque interruption in automated manual transmissions. The transmission can be more conveniently mounted on a vehicle in a relatively simple and compact configuration, and can contribute to improving fuel efficiency.

According to one aspect of the present disclosure, a transmission for a vehicle includes: a first input shaft that selectively receives power from an engine; a second input shaft that continuously receives power from the engine; an output shaft that is disposed in parallel with the first input shaft; a first countershaft that is disposed in parallel with the first input shaft and transmits power to the output shaft; a first shift unit that makes a series of desired gear shifts; a second countershaft that is disposed in parallel with the second input shaft and transmits power to the output shaft; a second shift unit that makes duplicate gear shifts each having a gear ratio substantially identical to, or less than, the gear ratio of one or more gear shifts made by the first shift unit; and a one-way clutch that is disposed in a power transmission line from the engine to the output shaft through the second shift unit and transmits power from the engine to the output shaft.

According to the present disclosure, the transmission for vehicle can inhibit or prevent deterioration of smooth shifting and riding comfort caused by torque interruption, and the present disclosure provides a transmission having a relatively simple and compact configuration, and it can be easily mounted in a vehicle and can contribute to improving fuel efficiency.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings in which:

FIGS. 2 to 5 are diagrams illustrating the operation of the transmission shown in FIG. 1 from a neutral state to a first gear-driving state; and FIGS. 6 to 9 are diagrams illustrating the operation of the transmission shown in FIG. 1 from the first gear-driving state to a second gear-driving state.

Figure 1:
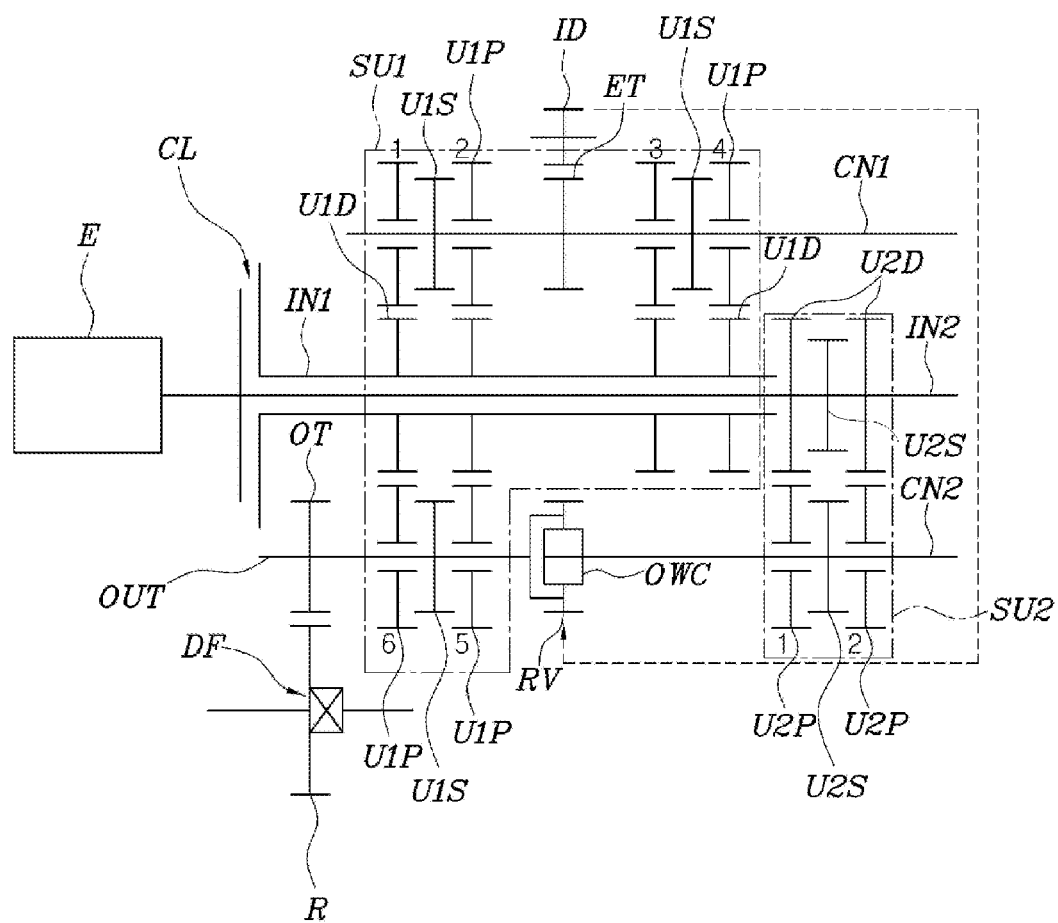
FIG. 1 is a diagram showing a transmission for a vehicle according to an embodiment of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a transmission for a vehicle of the present disclosure includes: a first input shaft "IN1" that selectively receives power from an engine "E"; a second input shaft "IN2" that continuously receives power from the engine E; an output shaft "OUT" that is arranged in parallel with the first input shaft IN1; a first countershaft "CN1" that is arranged in parallel with the first input shaft IN1 and transmits power to the output shaft OUT; a first shift unit "SU1" that makes a series of desired gear shifts between the first input shaft IN1 and the first countershaft CN1 or the output shaft OUT; a second countershaft "CN2" that is arranged in parallel with the second input shaft IN2 and transmits power to the output shaft OUT; a second shift unit "SU2" that makes duplicate gear shifts each having a gear ratio substantially identical to, or less than, a gear ratio of one of the gear shifts made by the first shift unit SU1, the gear shifts being between the second input shaft IN2 and the second counter shaft CN2; and a one-way clutch "OWC" that is disposed in a power transmission line from the engine E to the output shaft OUT through the second shift unit SU2 and transmits power from the engine E to the output shaft OUT.

That is, the transmission of the present disclosure has, other than a basic line that can transmit the power to the output shaft OUT through the first shift unit SU1, a line that can transmit power from the engine E with a gear ratio substantially identical to the gear ratio made by the first shift unit SU1 through the second shift unit SU2, thus interlocking between the power transmitted through the first shift unit SU1 and the power transmitted through the second shift unit SU2 can be structurally reduced or prevented by the one-way clutch OWC.

The first input shaft IN1, which is a hollow shaft fitted around the second input shaft IN2, is connected to the engine E through a clutch CL.

The second countershaft CN2 is arranged coaxially with the output shaft OUT, and in this embodiment, the one-way clutch OWC transmits power from the second countershaft CN2 only to the output shaft OUT.

In one form, the one-way clutch OWC may be arranged to be engaged with other gears of the second shift unit SU2.

An extracting gear ET for drawing power from the engine is disposed on the first countershaft CN1, a receive gear RV receiving power from the extracting gear ET is disposed on the output shaft OUT, and an idler gear ID for transmitting power is disposed between the extracting gear ET and the receive gear RV.

Accordingly, power from the engine E that comes out through the part for making a gear shift between the first input shaft IN1 and the first countershaft CN1 in the first shift unit SU1 is transmitted to the output shaft OUT sequentially through the extracting gear ET, the idler gear ID, and the receive gear RV, and then transferred to a differential connected to the output shaft OUT. This transmission of power is indicated by the dashed line in FIG. 1.

In this embodiment, the receive gear RV is disposed at an end of the output shaft and the one-way clutch connected to the second countershaft CN2 is disposed inside the receive gear RV.

Assuming that all of the gear shifts made by the first shift unit SU1 are a series of gear shifts from a first gear shift having the largest gear ratio to an n-th gear shift, the duplicate gear shifts made by the second gear shift unit SU2 are a series of gear shifts from a first gear shift to an m-th gear shift (m≤n, n and m are natural numbers).

For example, if all of gear shifts required by a vehicle are a first gear shift to a sixth gear shift, as in the depicted embodiment, the first shift unit SU1 is configured to be able to make a total of six forward gear shifts from a first gear shift having the largest gear ratio to a sixth gear shift having the lowest gear ratio, so n is 6, and the second shift unit SU2 is configured to be able to make first and second duplicate gear shifts, so m is 2.

The reason of m≤n is that the duplicate gear shifts r made by the second shift unit SU2 play an important part in inhibiting or preventing torque interruption that is generated in shifting and the torque interruption influences smooth shifting and comfort riding when a vehicle is driven at a low speed with a relatively large gear ratio.

That is, for example, if a vehicle has six forward gear shifts, the gear shifts where there is a problem with smooth shifting or comfort riding due to torque interruption while the vehicle is driven are typically the first gear shift to the third gear shift, but torque interruption does not often affect smooth shifting or comfort riding at higher gear shifts because the speed and the inertia of the vehicle are substantially high and large at those gear shifts. Accordingly, the second shift unit SU2 makes first and second duplicate gear shifts having the same or substantially identical gear ratios as those of low gear shifts in order to improve torque interruption that may be generated at the first gear shift to the third gear shift.

In other forms, the number of duplicate gear shifts that are made by the second shift unit SU2 may be increased or decreased in accordance with the design concept of a vehicle to be manufactured, but a plurality of duplicate gear shifts can be made sequentially from the gear shift having the largest gear ratio.

The first shift unit SU1 and the second shift unit SU2 both can make a plurality of gear shifts in a synchro-mesh type. That is, the first shift unit SU1 includes a plurality of first unit driving gears U1D on the first input shaft IN1 for making all of the gear shifts; a plurality of first unit driven gears U1P arranged on the first countershaft CN1 and the output shaft OUT, respectively, for making gear shifts by engaging with the first unit driving gears U1D; and first unit synchronizers U1S arranged on the first countershaft CN1 and the output shaft OUT, respectively, for allowing or preventing rotation of the first unit driven gears U1P with respect to the first countershaft CN1 and the output shaft OUT.

The second shift unit SU2 includes: a plurality of second unit driving gears U2D arranged on the second input shaft IN2 for making the duplicate gear shifts; a plurality of second unit driven gears U2P arranged on the second countershaft CN2 for making the duplicate gear shifts by engaging with the second unit driving gears U2D; and a second unit synchronizer U2S for allowing or preventing rotation of the second unit driven gears U2P, being arranged on the second countershaft CN2, with respect to the second countershaft CN2.

In one form, the second shift unit SU2 may have the second unit synchronizer U2S not on the second countershaft CN2, but rather on the second input shaft IN2.

The operation of the transmission for a vehicle which has the configuration described above is described with reference to FIGS. 1 to 9.

For reference, in FIG. 1, an output gear OT is on the output shaft OUT to be able to transfer power to a ring gear R of the differential DF.

FIG. 1 shows a neutral state, in which the first unit synchronizers U1S and the second unit synchronizer U2S are in a neutral state, so the engine E can be started regardless of whether the clutch CL is engaged or disengaged, but the clutch CL has been disengaged in FIG. 1.

In the state shown in FIG. 1, after the engine E is started, the first gear shift is engaged by the first shift unit SU1, as shown in FIG. 2, and then when the clutch CL is engaged, as shown in FIG. 3, the power from the engine E is shifted through the first shift unit SU1 and outputted to the output shaft OUT, so the vehicle is driven at the first gear shift, as shown by the darkened line in FIGS. 2 and 3.

After the vehicle is started in the state shown in FIG. 3, the second shift unit SU2 makes a first gear shift in duplicate, as in FIG. 4. Accordingly, in this state, the power from the engine E is transferred to the output shaft OUT through both of the first shift unit SU1 and the second shift unit SU2, as shown by the two darkened lines in FIG. 4.

In the state shown in FIG. 5, the first gear shift made by the first shift unit SU1 requires to be shifted to the neutral to prepare for shifting to the second gear shift, in which, similarly, the power from the engine E is continuously supplied to the output shaft with the first gear shift made by the second shift unit SU2, as shown by the darkened line in FIG. 5.

FIG. 6 shows a state when the clutch CL has been disengaged and the first shift unit SU1 has made the second gear shift from the state of FIG. 5, in which, similarly, the second input shaft IN2 directly receives the power from the engine E regardless of whether the clutch CL is disengaged or not, so the output at the first gear shift by the second shift unit SU2 is continuously transmitted to the differential DF through the output shaft OUT.

FIG. 7 shows shifting to the second gear shift by engaging the clutch CL from the state of FIG. 6, in which power transmitted through the clutch CL starts to be supplied to the output shaft OUT, with the gear ratio of the second gear shift through the first shift unit SU1.

The power shifted to the second gear shift through the first shift unit SU1 is applied to the output shaft OUT, but is not transmitted to the second countershaft CN2 by the one-way clutch OWC, so it does not interlock to the power transmitted to the second countershaft CN2 through the second shift unit SU2.

Accordingly, in this state, the vehicle is driven by the power at the first gear shift through the second shift unit SU2, and when the clutch CL is engaged, the power is shifted directly to the second gear shift through the first shift unit SU1 without torque interruption, so shifting is smoothly performed and comfort riding is improved.

In the state shown in FIG. 8, the second gear shift is made by the second shift unit SU2 from the state of FIG. 7, so the power from the engine E is supplied with the gear ratio of the second gear shift to the output shaft OUT through both of the first shift unit SU1 and the second shift unit SU2.

FIG. 9 shows a state when the second gear shift by the first shift unit SU1 is disengaged from the state of FIG. 8, in which preparing for shifting to the third gear shift is performed, and similarly, the power from the engine E is transferred with the gear ratio of the second gear shift to the output shaft OUT through the second shift unit SU2.

Similar to shifting to the second gear shift from the first gear shift, shifting to the third gear shift can be performed without torque interruption by disengaging the clutch CL, engaging the third gear shift through the first shift unit SU1, and then engaging the clutch CL.

In this embodiment, shifting to the fourth to sixth gear shifts is performed, similar to the related art, by disengaging the clutch CL, disengaging the previous gear shift, engaging the desired gear shift, and then disengaging the clutch CL only through the first shift unit SU1. Accordingly, although torque interruption is generated, as in the related art, they are higher gear shifts, so it does not largely influence smooth shifting or comfort riding, as described above.

Further, unlike this embodiment, if the second shift unit SU2 can make duplicate gear shifts the same as all of the gear shifts made by the first shift unit SU1, torque interruption can be inhibited or prevented in shifting to all of the gear shifts.

Although an exemplary embodiments of the present disclosure have been described for illustrative purposes, those skilled in the art will appreciate that various modifications, additions and substitutions are possible, without departing from the scope and spirit of the invention as disclosed in the accompanying claims.

What is claimed is:

1. A transmission for a vehicle, comprising:
   a first input shaft selectively receiving power from an engine;
   a second input shaft continuously receiving power from the engine;
   an output shaft arranged in parallel with the first input shaft;
   a first countershaft arranged in parallel with the first input shaft and configured to transmit power to the output shaft;
   a first shift unit configured to perform a series of gear shifts arranged between the first input shaft and the output shaft, and between the first input shaft and the first countershaft;
   a second countershaft arranged in parallel with the second input shaft and configured to transmit power to the output shaft;
   a second shift unit arranged on the second input shaft and the second countershaft so as to carry out duplicate gear shifts, the duplicate gear shifts duplicating at least a portion of the gear shifts in the series of the gear shifts of the first shift unit, each duplicate gear shift having a gear ratio substantially identical to a gear ratio of a corresponding gear shift of the first shift unit; and
   a one-way clutch configured to transmit power from the engine only to the output shaft,
   wherein the second countershaft is collinearly arranged with the output shaft, and spaced apart from the output shaft, and wherein the one-way clutch is disposed between the second countershaft and the output shaft such that the one-way clutch transmits power from the second countershaft only to the output shaft.

2. The transmission according to claim 1, wherein the first input shaft is a hollow shaft fitted around the second input shaft and connected to the engine through a clutch.

3. The transmission according to claim 1, wherein an extracting gear configured to draw power from the engine is disposed on the first countershaft, a receive gear receiving the power from the extracting gear is disposed on the output shaft, and an idler gear is arranged between the extracting gear and the receive gear so as to transfer the power.

4. The transmission according to claim 3, wherein the receive gear is disposed at an end of the output shaft and the one-way clutch connected to the second countershaft is disposed inside the receive gear.

5. The transmission according to claim 1, wherein among the gear ratios of the gear shifts performed by the first shift unit and of the duplicate gear shifts, a largest gear ratio of the gear shifts of the first shift unit is substantially identical to a largest gear ratio of the duplicate gear shifts, and wherein a lowest gear ratio of the duplicate gear shifts is equal to or larger than a lowest gear ratio of the gear shifts of the first shift unit.

6. The transmission according to claim 1, wherein the first shift unit comprises:
   a plurality of first unit driving gears arranged on the first input shaft and configured to make the series of gear shifts;
   a plurality of first unit driven gears arranged on the first countershaft and the output shaft configured to make the series of gear shifts by engaging with the first unit driving gears; and
   first unit synchronizers configured to allow or inhibit rotation of the first unit driven gears with respect to the first countershaft and the output shaft, the first unit synchronizers arranged on the first countershaft and the output shaft, respectively.

7. The transmission according to claim 6, wherein the second shift unit comprises:
   a plurality of second unit driving gears arranged on the second input shaft and configured to make the duplicate gear shifts;
   a plurality of second unit driven gears arranged on the second countershaft and configured to make the duplicate gear shifts by engaging with the second unit driving gears; and a second unit synchronizer arranged on the second countershaft and configured to allow or inhibit rotation of the second unit driven gears with respect to the second countershaft.

8. The transmission according to claim 6, wherein the second shift unit comprises:
- a plurality of second unit driving gears arranged on the second input shaft and configured to make the duplicate gear shifts;
- a plurality of second unit driven gears arranged on the second countershaft and configured to make the duplicate gear shifts by engaging with the second unit driving gears; and
- a second unit synchronizer arranged on the second input shaft and configured to allow or inhibit rotation of the second unit driving gears with respect to the second input shaft.

9. The transmission according to claim 1, wherein the gear shifts performed by the first shift unit include a number N of gear shifts, and wherein the duplicate gear shifts performed by the second shift unit include a number M of gear shifts, and wherein M<=N.

\* \* \* \* \*